May 26, 1964 W. E. WOLSTENHOLME 3,134,256
STRESS RELAXOMETER METHOD AND APPARATUS
Filed Oct. 5, 1960 3 Sheets-Sheet 1

INVENTOR
William E. Wolstenholme
BY Jack Rosin
ATTORNEY

May 26, 1964 W. E. WOLSTENHOLME 3,134,256
STRESS RELAXOMETER METHOD AND APPARATUS
Filed Oct. 5, 1960 3 Sheets-Sheet 2
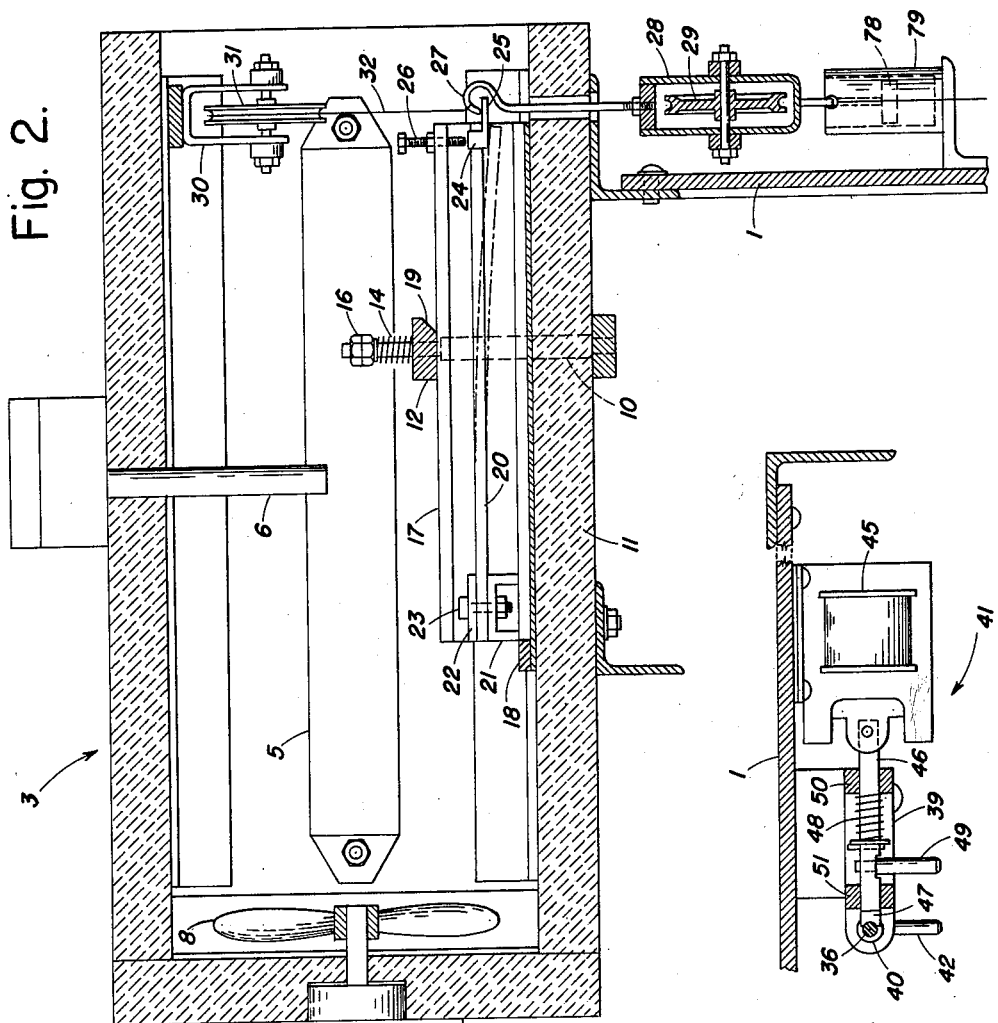
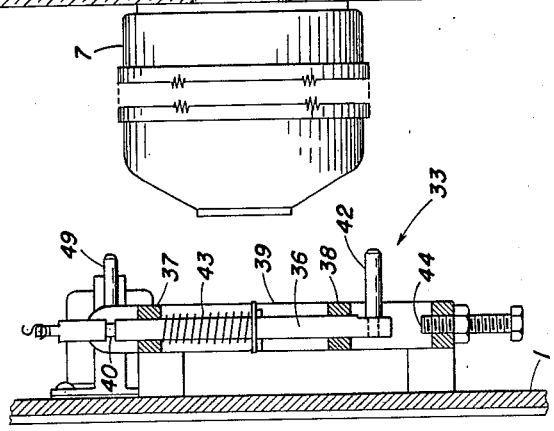
INVENTOR
William E. Wolstenholme
BY Jack Rosin
ATTORNEY May 26, 1964 W. E. WOLSTENHOLME 3,134,256
STRESS RELAXOMETER METHOD AND APPARATUS
Filed Oct. 5, 1960 3 Sheets-Sheet 3
Fig. 6.
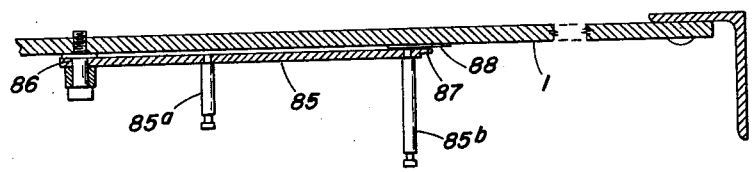
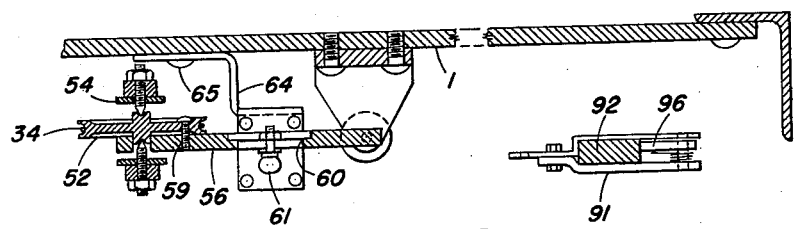
Fig. 8.
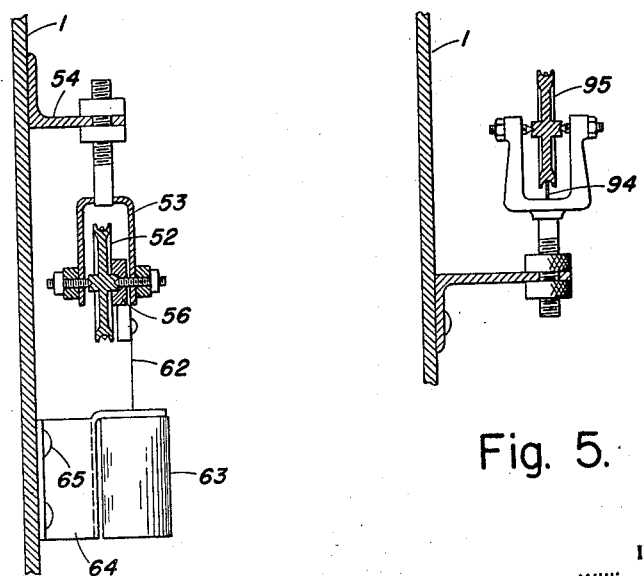
Fig. 7.
Fig. 5.
INVENTOR
William E. Wolstenholme
BY Jack Rosin
ATTORNEY 3,134,256
STRESS RELAXOMETER METHOD AND
APPARATUS
William E. Wolstenholme, Wayne, N.J., assignor to
United States Rubber Company, New York, N.Y.,
a corporation of New Jersey
Filed Oct. 5, 1960, Ser. No. 60,631
6 Claims. (Cl. 73—15.6)

This invention relates to measuring methods and apparatus and, more particularly, to the measurement of stress relaxation in a flexurally strained test sample.

Stress relaxation refers to the decay of stress, measured as a function of time, that occurs within a test sample while it is maintained at a constant deflection or strain. Measurements of this type are of particular importance in that they provide detailed and accurate information with respect to the structural characteristics of materials, particularly as to the useful life at fixed stress levels and temperatures. They are obtained by an instrument that has been conveniently termed a "stress relaxometer."

While stress relaxation is an accepted physical measurement that has been in use for a long time, little improvement has been made in stress relaxometers to facilitate the taking of these measurements. Most prior art stress relaxometers have a number of important defects which, cumulatively, make these instruments inefficient and cumbersome to use. Their capacity to handle both short-term and long-term stress decay measurements is generally limited; they usually cannot be used to concurrently test a large number of samples over a long-term period; and, often, the stress relaxation data secured begins at some finite time after loading, with the resulting disadvantage that the initial instantaneous maximum stress is never known.

The present flexural stress relaxometer invention was made to overcome the disadvantages of the prior art methods and apparatus and, accordingly, has for its primary object the provision of improved methods and apparatus for the measurement of flexural stress relaxation.

Another object of this invention is to provide an improved flexural stress relaxometer that is capable of running concurrent long-term stress relaxation tests on numerous samples.

An additional object of this invention is to provide an improved flexural stress relaxometer adapted to both short-term and long-term stress decay measurement.

Further objects and advantages of this invention will become apparent as the following description proceeds.

Briefly stated, and in accordance with one embodiment of this invention, means are provided in a stress relaxometer by which a heated sample may be deflected flexurally by a predetermined amount, and the stress developed in the sample may be recorded to provide continuous stress level information in the initial stages of stress relaxation. Means are also provided by which the strained sample may be independently clamped in its deflected position to allow its removal from the relaxometer and its storage in a heated receptacle during intervals between the taking of readings thereon in the later stages of stress relaxation, so that long-term stress relaxation data may be obtained on a plurality of samples concurrently under test, using a single instrument.

While the specification concludes with claims particularly pointing out and distinctly claiming the subject matter of this invention, it is believed that the invention will be better understood from the following description of one embodiment thereof, taken in connection with the accompanying drawings in which:

FIGURE 2 is a view taken along the line 2—2 of FIGURE 1 showing details of an oven, test sample holder, and pulley connections for deflecting a cantilever test sample;

FIGURE 3 is a view taken along the line 3—3 of FIGURE 1 illustrating a portion of the means utilized to deflect the sample under test;

FIGURE 4 is a view taken along the line 4—4 of FIGURE 1 illustrating another portion of the means utilized to deflect the sample under test;

FIGURE 5 is a view taken along the line 5—5 of FIGURE 1 showing the manner in which one of the pulleys employed in this invention is mounted;

FIGURE 6 is a view taken along the line 6—6 of FIGURE 1 showing an intermediate indicating lever utilized in taking long-term stress relaxation readings;

FIGURE 7 is a view taken along the line 7—7 of FIGURE 1 illustrating a portion of the means utilized to measure the stress level in the test sample; and FIGURE 8 is a view taken along the line 8—8 of FIGURE 1 showing additional details of the means employed to measure the stress level in the test sample.

Figure 1:
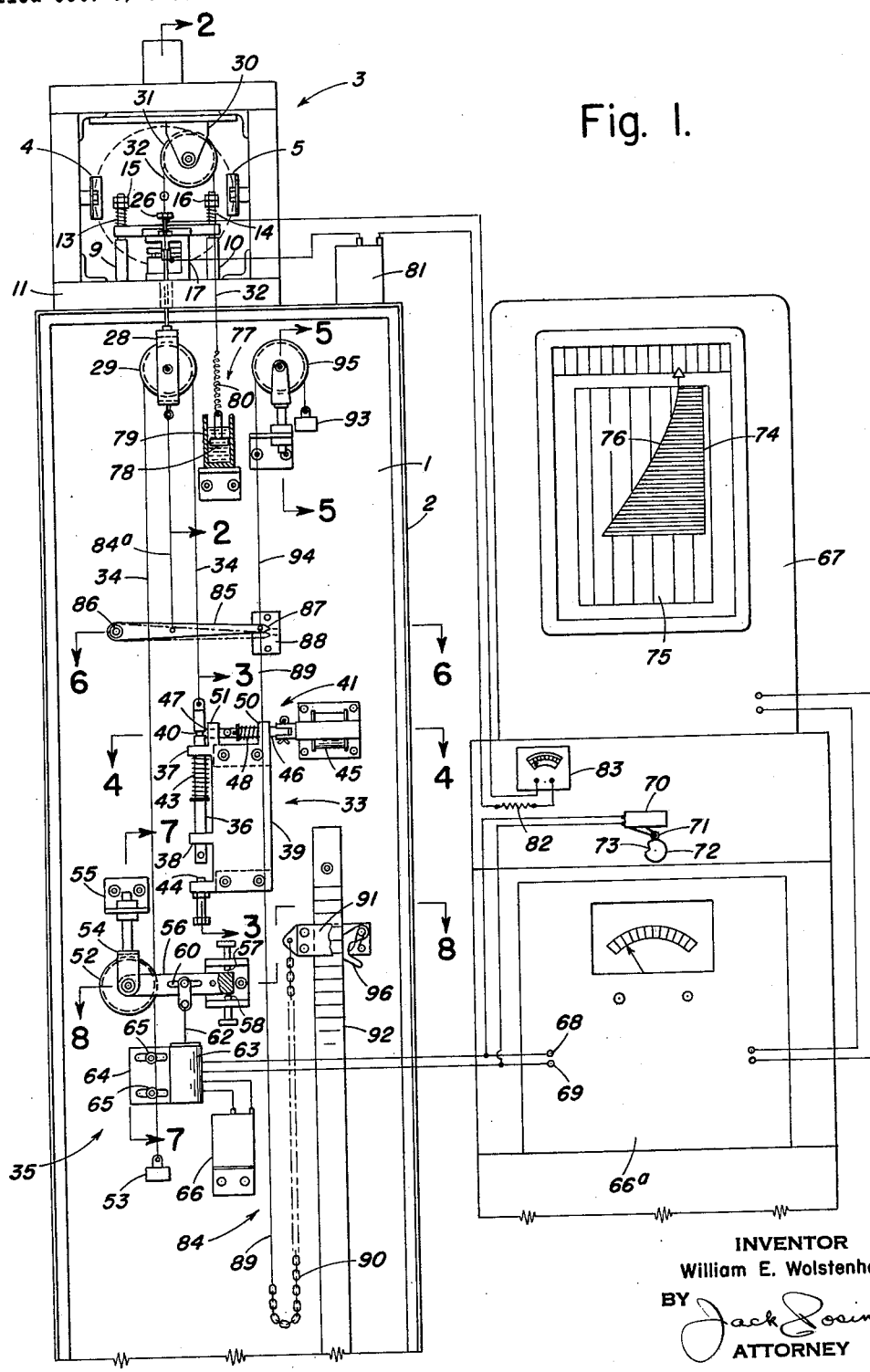
FIGURE 1 is a front elevational view of a flexural stress relaxometer made in accordance with the principles of this invention.

Referring to FIG. 1, there has been illustrated a stress relaxometer made in accordance with the principles of this invention for use in taking flexural stress decay measurements in cantilever beam samples. The stress relaxometer includes a support plate 1 mounted in a cabinet frame 2 to form a vertical support upon which a number of the components of the stress relaxometer are mounted. An oven, shown generally at 3, is employed to heat the sample under test to a predetermined desired temperature. The oven 3 includes a pair of heating elements 4 and 5 and, referring to FIGURE 2, a thermostat 6, which may be conventionally connected in an electrical circuit to the heating elements 4 and 5 for maintaining the temperature of the oven at a desired level. A motor 7 and fan 8 may also be operably connected into the electrical control circuit for the heating elements 4 and 5 to cooperate therewith in maintaining the desired predetermined temperature.

A pair of vertical support posts 9 and 10 (FIG. 1), mounted on the bottom wall 11 of the oven 3 and having threaded upper ends, cooperate with a horizontal clamp 12 that is spring-loaded to force it down towards shoulders formed on the support posts 9 and 10. Springs 13 and 14, which are compressed by nuts 15 and 16, respectively, provide the loading on clamp 12. Clamp 12 presses downwardly against a C-shaped channel type sample holder 17, the bottom surface of which rests on the bottom wall 11 of the oven 3.

Referring more particularly to FIG. 2, the sample holder 17 is positioned in the oven 3 by inserting it beneath the clamp 12 and against a stop 18. The clamp 12 is provided with a chamfered leading edge 19 to facilitate entry of the sample holder into its proper position in the oven. The springs loading the clamp 12 are compressed sufficiently to hold the sample holder properly in place against the bottom wall of the oven 11 during testing and yet allow the sample holder to be conveniently removed and replaced by another to facilitate rapid switching of samples under test.

In the arrangement shown, the stress relaxometer is designed for testing stress relaxation of a cantilever beam type sample 20. The sample 20 may, for example, comprise a bar 8½ inches long, ½ inch wide, and ¼ inch thick. The test sample 20 is rigidly supported at one end by a bracket 21 and clamp 22, the clamp being held against the bracket by a pair of bolts one of which is shown at 23. The test sample 20 is located centrally within the C-shaped channel sample holder 17 in its relaxed condition, and has fastened to its free end a metallic clip 24 having a protruding lip 25. A metallic adjusting screw 26, mounted in the upper plate of the sample holder 17 and movable toward the metallic clip 24, is provided to maintain the sample 20 in its deflected condition for long-term stress decay readings after the initial short-term readings have been made. This arrangement will be more fully described hereinafter.

A hook 27, which is adapted to engage the lip 25 of the clip 24 at the free end of the sample 20, supports a pulley bracket 28 having a pulley wheel 29 rotatably mounted therein. A second pulley bracket 30, having a pulley wheel 31 rotatably mounted therein, is mounted on the top wall of the oven 3. A wire 32, which has one end affixed to the hook 27, is supported by pulley wheel 31 in such a manner that the axis of the wire passes through the point of contact between the lip 25 and the hook 27 for purposes which will be brought out more fully hereinafter.

A deflecting means, shown generally at 33 is attached by a wire 34 that passes over pulley 29 to a strain gauge transducing means, shown generally at 35. Deflecting means 33 is provided for deflecting the cantilever test sample a predetermined amount from its relaxed condition. The deflecting means 33 includes a reciprocable rod 36 that is slidably mounted in a pair of axially aligned bushings 37 and 38. The bushings 37 and 38, in turn, are carried by a support plate 39 mounted on the vertical support plate 1.

Referring more particularly to FIGURE 3, it may be seen that the rod 36 has formed therein a circumferential groove 40 adjacent its upper end. The groove 40 is adapted to be engaged by actuating means, shown generally at 41 in FIG. 1. The rod 36 (FIG. 3) also has a reset lever 42 fixed at its lower end for manually raising the deflecting means 33 against the bias of a spring 43 that tends to urge the rod 36 down against an adjustable stop 44.

Referring now to FIG. 4, the actuating means 41 for actuating the deflecting means 33 has there been illustrated. The actuating means 41 comprises a solenoid 45, the armature of which is connected to an operating rod 46 which, in turn, carries a protruding lug 47 that engages the groove 40 in the reciprocable rod 36. Operating rod 46 is spring biased by a spring 48 that causes lug 47 to engage the groove 40. Energizing the solenoid 45 moves the operating rod 46 against the spring 48 to automatically unlatch the deflecting means 33. A lever 49 is also provided for manual operation of the actuating means. The operating rod 46 is mounted for axially sliding movement in a pair of spaced bushings 50 and 51 carried by the support plate 39.

Assuming for the present that the end of wire 34 connected to the strain gauge transducer means 35 is fixed (FIG. 1), upon energization of the solenoid 45 the projecting lug 47 becomes disengaged from the circumferential groove 40, and spring 43 projects the reciprocable rod 36 rapidly downwardly against the stop 44. When this occurs, the wire 34 is put under tension and is drawn about pulley 29, causing the pulley 29 (FIG. 2) to draw the free end of the test sample 20 down a predetermined amount (as indicated by the dotted lines), dependent upon the setting of the adjustable stop 44 (FIG. 1). In this manner, a predetermined flexural strain may be applied very rapidly to the sample under test in the stress relaxometer.

Referring now to FIGURES 1 and 8, it may be seen that the wire 34 passes from pulley 29 to a pulley 52 about which it is wound, and thence down to a weight 53. Pulley 52 is rotatably supported in a pulley mount 54 which is suspended from a bracket 55 attached to the vertical support plate 1. A lever 56, which is pivotally mounted for limited rotation between stops 57 and 58 about the same axis as pulley 52, is locked to the pulley 52 (FIG. 8) by means of a screw 59 in order that it will rotate with the pulley.

The lever 56 is slotted as shown at 60 and provided with a clamp 61 movable within the slot 60, the clamp having attached thereto a wire 62 (FIG. 1). The wire 62, in turn, is connected with a strain gauge transducer 63 that is adjustably positioned by means of the slotted bracket 64 and bolts 65.

The strain gauge transducer 63 may, for example, be of an unbonded type similar to Model No. G1-16-350 made by Statham Instruments, Inc., which requires only 16 ounces of force (resulting in .0015 inch of displacement) in order to achieve maximum signal output. The maximum movement of lever 56 is restricted by the stops 57 and 58, so that the strain gauge cannot be overloaded.

The value of weight 53 should be chosen in such a manner that the sum of the clockwise moments due to the weight 53, the weights of the lever 56, clamp 61, and wire 62, and the force exerted by transducer 63 when it is deflected an amount within its operating range, is exactly equal and opposite to the counterclockwise moment exerted on lever 56 by the strained sample 20 through the wire 34 and pulley 52.

In this manner a force balance is created on lever 56 during operation of the relaxometer and, as the force exerted by the sample 20 diminishes with time, the output of the strain gauge transducer 63 also diminishes. It is apparent that the weight 53 must be individually selected for different types of sample material undergoing test in order that the force balance will occur within the operating range of the strain gauge transducer 63. It should also be noted that the lever 56 will be free from the stops 57 and 58 whenever the force balance occurs within the operating range of the strain gauge transducer 63 and that these stops prevent overloading or improper loading of the transducer.

In order to provide further flexibility with respect to setting up the force balance on lever 56, the strain gauge transducer 63 may be laterally moved by loosening the bolts 65. Similarly, the clamp 61 may be moved laterally in its slot 60 to compensate for the movement of the strain gauge transducer 63. The net effect of moving the strain gauge transducer 63 to either side from the position shown, of course, will be to change the moment arm due to the strain gauge transducer 63 in the force balance system set up on lever 56. Thus, by either changing the weight 53 or shifting the position of transducer 63, two separate methods of compensating for differing stresses are provided to facilitate the testing of different types of test samples.

The particular type of straing gauge transducer 63 employed with the illustrated embodiment requires a 12 volt (A.C. or D.C.) excitation voltage in its operation. A battery 66 has been illustrated as a D.C. excitation voltage source in FIG. 1, but it is apparent that various other arrangements can be utilized.

In order to secure a permanent record of the stress relaxation curve for the material undergoing test, the output of the strain gauge transducer 63 is fed to a D.C. amplifier 66a which amplifies the D.C. signal from the transducer 63 and feeds it to a recorder 67. Input terminals 68 and 69 on the D.C. amplifier 66a, in addition to receiving the variable D.C. output signal from the transducer 63, are shunted by the contacts of a normally open limit switch 70 to provide a zero voltage input reference to the D.C. amplifier 66a when the contacts close. The actuating arm 71 of limit switch 70 rides on a cam 72 having a depression 73 formed in its periphery. Cam 72 may be rotated by a motor (not shown) so that the contacts of the limit switch 70 are periodically closed by the entry of actuating arm 71 into the depression 73. This provides a zero voltage input to the input terminals 68 and 69 of the D.C. amplifier 66a and results in a zero output from the amplifier, which, in turn, provides a base reference line 74 on the chart 75 of the recorder 67. Should the D.C. amplifier 66a begin to drift, the drift would show up as a displacement to the left or right of the base reference line 74 on the chart 75 and this, in turn, would indicate to an operator that the zero setting of the D.C. amplifier 66a should be adjusted to compensate for the drift. Between the periodic drift checks on the amplifier 66a, the output of the amplifier follows a curve, indicated at 76, representative of the stress relaxation of the material being tested.

A counterweight and damping arrangement, shown generally at 77 on FIG. 1, is provided to counter-balance the weight of the components supported by the hook 27 (FIG. 2) and to dampen any vibration of these components and the sample that may arise from the rapid automatic deflection mechanism described previously. It is connected to the hook 27 by means of the previously mentioned wire 32 which passes over the pulley 31. The counterweight 78 serves a dual function in that it also serves as a damping piston operable in a fluid-filled cylinder 79. To permit instantaneous complete deflection of the sample to its fully deflected position such that the maximum deflection of the sample is not delayed by the viscous drag of the damper, which would introduce an initial error in the maximum initial stress value, the damping piston (counterweight) is connected by a properly selected rubber band spring 80 to the wire 32. The type of fluids used in cylinder 79, the clearance between the piston and cylinder walls, the rubber band spring 80 and the weight of the counterweight must all be carefully chosen and adjusted for optimum effect. As a result of this, accurate initial stress readings are obtainable on the sample being tested and vibrations are reduced to relatively insignificant wiggles on the graphic record.

As previously indicated, when it is desired to take intermittent long-term readings on various test samples mounted in holders, the sample holder 17 (FIG. 2) may be removed and replaced with another sample holder having a different test sample. In order to maintain the deflected sample 20 with precisely the correct amount of deflection, the adjusting screw 26 is turned down (while the test sample 20 is deflected by the deflecting means 33) until it just makes contact with the metallic clip 24. The exact point of contact may be determined by providing an electrical circuit incorporating the metallic clip 24 and adjusting screw 26 as switch contacts and having (FIG. 1) a battery 81, a current limiting resistor 82, and milliammeter 83 in series with the switch formed by the adjusting screw 26 and metallic clip 24. Thus, just prior to removing the sample holder 17 from the oven 3, the adjusting screw 26 is turned down (by putting a screwdriver through a small port in the top of the oven) against the metallic clip 24 until the milliammeter 83 indicates a flow of electrical current through the circuit. At this point the deflecting screw is properly set to retain the sample with the desired amount of deflection. The hook 27 (FIG. 2) may now be disengaged from the metallic clip 24, the sample holder 17 may be removed from its position under the clamp 19, and a new sample holder, having a previously deflected sample, may be inserted.

The electrical leads which connect to the adjusting screw 26 and metallic clip 24 may be of the quick fastening type such as, for example, alligator clips (not shown), to facilitate changing sample holders. Upon inserting a new sample holder into the oven 3 for long-term tests and connecting the alligator clips to the adjusting screw 26 and metallic clip 24, the ammeter 83 will indicate that a completed electrical circuit exists. At this point, assuming the deflecting means 33 has previously been reset, the hook 27 may again be put into engagement with the metallic clip 24 without affecting the opening or closing of the contact between the adjusting screw 26 and the metallic clip 24.

Since the sample is at this time being deflected by the adjusting screw 26, if the deflecting means 33 were actuated it would not necessarily cause the sample to deflect sufficiently to open the electrical contact between the deflecting screw 26 and the metallic clip 24. In view of this, an alternate, Chainomatic type, loading system is provided to uniformly add increments of deflecting force to the free end of the test sample 20 until the electrical contact between the adjusting screw 26 and the metallic clip 24 breaks. At that point the necessary force required to just break the contact is indicative of the stress existing in the test sample.

The Chainomatic loading system, shown generally at 84 (FIG. 1), includes a wire 84a, suspended from the bottom of pulley bracket 28 and connected to an indicating lever 85. Lever 85 is pivotally supported at one end 86 and has its free end 87 cooperating with a scale 88 to indicate the amount of deflection of the sample. The free end 87 of lever 85 has attached thereto a wire 89 to which is connected one end of a chain 90. The other end of chain 90 is fastened to a slidable clamp 91 which may be moved along a ruler or yardstick 92. The relation between the ruler 92, the clamp 91, and the chain 90 is such that, with the clamp 91 at the top of the ruler 92, the weight of chain felt on the wire 89 is nominal and, as the clamp 91 is moved down on the ruler 92, uniform increments of weight are added to the sample.

In order to counterbalance the weight of the indicating lever 85, wire 89, and nominal weight of chain 90 acting to deflect the sample when the clamp 91 is at the top of ruler 92, a counterweight 93 is connected to the free end 87 of indicating lever 85 by means of a wire 94 that passes over a pulley 95. The clamp 91 (FIGS. 1 and 8) includes a spring-loaded lever 96 that tends to lock the clamp 91 in position on the ruler 92 until it is released.

Details of the pulley 95 may be seen in FIG. 5 and details of the indicating lever 85 may be seen in FIG. 6. It may be noticed from FIG. 6 that the indicating lever 85 is provided with projecting lugs 85a and 85b. Wire 84a (FIG. 1) is connected to projecting lug 85a and wires 94 and 89 are connected to projecting lug 85b. The lengths of the projecting lugs 85a and 85b are selected to insure that the various wires connected thereto will clear the various components mounted on the vertical support plate 1, and, therefore, operate freely without interference.

A conversion chart may be prepared, in a manner well known to the art, for correlating the reading obtained on the rule 92 (FIG. 1), when the milliammeter 83 just indicates that the circuit between adjusting screw 26 and metallic clip 24 is broken, with the force exerted by the chain 90 on the sample. Thus, the Chainomatic loading arrangement provides a convenient and accurate method of obtaining long-term intermittent readings on test samples, and, in conjunction with the removable sample holder 17 facilitates the use of the stress relaxometer to take long-term readings concurrently on a plurality of samples that may be under test.

It is to be understood, of course, that those samples which are not actually undergoing test in the stress relaxometer should be stored in ovens set to maintain the predetermined temperature and should be retained in their deflected condition over the entire long-term period.

While a particular embodiment of this invention has been shown and described, it will be obvious to those skilled in the art that numerous changes and modifications may be made without departing from this invention in its broader aspects, and it is, therefore, aimed in the appended claims to cover all such changes and modifications as fall within the true spirit and scope of this invention.

Having thus described my invention, what I claim and desire to protect by Letters Patent is:

1. Apparatus for measuring stress decay in a test sample comprising means for rigidly supporting a cantilever test sample at one end; pulley means; means for connecting said pulley means to the free end of said sample; flexible connecting means supported by said pulley means; strain gauge transducer means connected adjacent one end of said flexible connecting means; deflecting means connected adjacent the other end of said flexible connecting means and operative, when actuated, to deflect the sample; and means for actuating said deflecting means, whereby the stress developed in the sample is transmitted through said pulley means and said flexible connecting means to be sensed in said transducer means for providing an indication of the value of stress in said sample.

2. Apparatus for measuring stress decay in a test sample comprising a support; an oven positioned at an elevated level on said support; clamping means carried within said oven for rigidly clamping one end of a cantilever test sample therein; a pulley; means for connecting said pulley to the free end of said sample for transmitting a deflecting force thereto; deflecting means mounted on said support at a lower level than said pulley and at one side thereof for initiating a deflecting force; transducer means mounted on said support at a lower level than said pulley at another side thereof; and flexible connecting means passing over said pulley and interconnecting said transducer means and said deflecting means whereby, upon deflection of the deflecting means and developing of a stress within said sample, the transducer means acts in opposition to the developed stress and generates an electrical signal which varies as the stress level changes in the sample.

3. The apparatus of claim 2 and further including damping means connected to said pulley for damping out vibrations occurring at initial deflection of the sample, amplifying means for amplifying the electrical signal from said transducer means, and recording means responsive to the amplified signal for recording changes in value of the stress within the test sample.

4. A method of testing a sample comprising the steps of mounting the sample to be tested in a portable holder; installing said holder in a testing device; heating the sample to a predetermined temperature; deflecting the sample a predetermined amount to set up a deflection stress in the heated and deflected sample; developing an electrical signal which varies with changes in the deflection stress for recording the initial values of deflection stress in the sample; clamping the deflected sample in its deflected condition in said holder; removing said holder from the testing device while retaining said sample in its deflected condition; storing the deflected sample and holder in a separate receptacle heated to said predetermined temperature; and intermittently thereafter installing said sample and holder in a testing device and determining the value of the residual stress in the sample, whereby a plot of stress decay over a prolonged period of time may be obtained for the sample.

5. The method of claim 4 wherein the sample being tested is a cantilever, the free end of which is deflected to initiate the deflection stress therein.

6. A method of concurrently testing a plurality of samples over a prolonged period of time comprising the steps of (1) mounting a sample to be tested in a portable holder; (2) installing said holder in a testing device; (3) heating the sample in said holder to a predetermined temperature; (4) deflecting said sample a predetermined amount to set up a deflection stress therein; (5) developing an electrical signal which varies with changes in said deflection stress for recording the initial and short-term values of deflection stress in said sample; (6) clamping said sample in its deflected condition in said holder; (7) removing said holder from the testing device while retaining said sample in its deflected condition; (8) storing said holder and deflected sample in a receptacle heated to said predetermined temperature; (9) intermittently thereafter installing said holder in a testing device to determine the long-term residual stress in said sample; and (10) repeating steps (1) through (9) with each of the samples to be tested, whereby a plot of stress decay over a prolonged period of time may be concurrently obtained on each of a plurality of test samples.

References Cited in the file of this patent

UNITED STATES PATENTS

| | | |
|---|---|---|
| 2,696,735 | Woodward | Dec. 14, 1954 |
| 3,082,621 | Soderholm | Mar. 26, 1963 |

OTHER REFERENCES

Publication by Watson et al. in Journal of Applied Physics, volume 26, Number 6, June 1955, pages 701–705.

Gurnee, E. F., Apparatus for Making Simultaneous Stress and Birefringence Measurements on Polymers. In Journal of Applied Physics 26 (9), pages 1106–1110, September 1955, Qc 1.J82.